US009010238B2

(12) United States Patent
Bodum

(10) Patent No.: US 9,010,238 B2
(45) Date of Patent: Apr. 21, 2015

(54) TEA-MAKER HAVING A CLOSABLE POURING SPOUT

(75) Inventor: Jørgen Bodum, Meggen (CH)

(73) Assignee: PI-Design AG, Triengen (CH)

( * ) Notice: Subject to any disclaimer, the term of this patent is extended or adjusted under 35 U.S.C. 154(b) by 430 days.

(21) Appl. No.: 13/505,414

(22) PCT Filed: Nov. 2, 2009

(86) PCT No.: PCT/CH2009/000347
§ 371 (c)(1),
(2), (4) Date: May 1, 2012

(87) PCT Pub. No.: WO2010/031198
PCT Pub. Date: Mar. 25, 2010

(65) Prior Publication Data
US 2012/0216682 A1    Aug. 30, 2012

(51) Int. Cl.
A47J 31/10    (2006.01)
A47J 31/20    (2006.01)
A47J 31/06    (2006.01)
A47J 31/36    (2006.01)

(52) U.S. Cl.
CPC .............. *A47J 31/20* (2013.01); *A47J 31/0636* (2013.01); *A47J 31/36* (2013.01)

(58) Field of Classification Search
CPC ........ A47J 31/0636; A47J 31/20; A47J 31/36
USPC ................ 99/322, 317, 318, 321, 323.3, 297; 222/475.1, 472, 473, 474, 517; 220/524, 523
See application file for complete search history.

(56) References Cited

U.S. PATENT DOCUMENTS

| 674,456 | A | * | 5/1901 | Darden ............................ 99/287 |
| 1,018,684 | A | * | 2/1912 | Smith ............................... 99/317 |
| 1,563,155 | A | * | 11/1925 | Buckingham .................... 99/322 |
| 2,812,116 | A | * | 11/1957 | Newman ........................ 222/183 |
| 5,453,189 | A |  | 9/1995 | Joergensen |
| 5,779,102 | A | * | 7/1998 | Smith .......................... 222/144.5 |

(Continued)

FOREIGN PATENT DOCUMENTS

| GB | 2 401 308 A | 11/2004 |
| WO | 2007/082391 A1 | 7/2007 |

(Continued)

OTHER PUBLICATIONS

International Search Report of PCT/CH2009/000347 dated Sep. 2, 2010.

*Primary Examiner* — Reginald L Alexander
(74) *Attorney, Agent, or Firm* — Sughrue Mion, PLLC

(57) ABSTRACT

A beverage maker which has an open top container, a filter insert and a lid. The lid comprises a lid lower part having a lower lid wall in which an insertion opening is configured for inserting the filter insert. In order to prevent liquid from pouring or squirting out of the container and in order to reduce heat losses, the lid lower part is sealingly held on the container, a pouring spout is configured in the lower lid wall and the lid comprises a closure for the pouring spout. The closure has a lever which is mounted above the lower lid wall to be swivelable about a horizontal axis. The lever has an actuation region in order to swivel the lever from a first position in which the closure closes the pouring spout to a second position in which the closure releases the pouring spout.

20 Claims, 4 Drawing Sheets

(56) References Cited

U.S. PATENT DOCUMENTS

| | | | |
|---|---|---|---|
| 6,997,104 B1* | 2/2006 | Lin | ............................ 99/323.3 |
| 7,464,637 B1 | 12/2008 | Lin | |
| 2007/0028779 A1 | 2/2007 | Pigliacampo et al. | |

FOREIGN PATENT DOCUMENTS

| | | |
|---|---|---|
| WO | 2009/109011 A1 | 9/2009 |
| WO | 2009/149568 A2 | 12/2009 |
| WO | 2010/003258 A1 | 1/2010 |

* cited by examiner

TEA-MAKER HAVING A CLOSABLE POURING SPOUT

TECHNICAL FIELD

The present invention relates to a beverage maker having a vessel, which is open in the upward direction, and a filter insert, which can be inserted into the vessel. Such beverage makers are often used for preparing tea. They will therefore be referred to hereinbelow, to simplify matters, as tea makers, although they can also be used for preparing beverages other than tea.

PRIOR ART

A large number of embodiments of such tea makers are available. One such tea maker is supplied, for example, under the name BISTRO NOUVEAU 1870 by the BODUM® Group (page 47 of the 2009 BODUM® catalog). The tea maker comprises a cylindrical teapot, with a multi-part lid inserted loosely into its upper opening. The lid comprises a lower lid part, which is designed as a retaining ring for a filter insert, and an upper lid part. A filter insert is inserted into the lower lid part. This filter insert has a multiplicity of openings, in order to allow liquid to pass through and to hold tealeaves or the like back. In order to prepare tea, tealeaves are placed in the filter insert and brewed using hot water. Following infusion, the filter insert is removed from the teapot. The upper lid part is then placed in position on the lower lid part and covers over the introduction opening for the filter insert, in order to reduce heat losses.

Plunger-type tea makers, also referred to by the name "tea press" for short, are likewise known from the prior art. In the case of such tea makers, there is no need for the filter insert to be removed from the teapot following infusion. Such a plunger-type tea maker is described, for example, in U.S. Pat. No. 5,453,189. In the latter document, a filter insert is inserted directly into the upper opening of a (in this case convex) teapot. The filter insert has a cylindrical side-wall region, wherein at least an upper part of this region has a multiplicity of openings, in order to allow liquid to pass through and to hold tealeaves or the like back. A lower part of the cylindrical side-wall region and the base of the filter insert, in contrast, are liquid-impermeable. A plunger, which is likewise largely liquid-impermeable, can be pushed with sealing action into the filter insert. In order to prepare tea, tealeaves are placed in the filter insert and brewed using hot water. Once the tealeaves have infused for long enough, the plunger is pushed into the filter insert and pressed down into the liquid-impermeable, lower part of the filter insert. It carries along the tealeaves with it and separates them from the surrounding liquid, further infusion of the tea therefore being avoided. The plunger is connected to a plunger rod, which, in turn, is guided through a lid, by means of which the vessel can be covered over in the upward direction. It is also the case that a large number of embodiments of such plunger-type tea makers are available from the BODUM® Group.

The filter insert is designed in a number of embodiments as in WO 2007/082391, the content of which is included herein by reference in its entirety. This document discloses a filter insert with a basic body, in the upper region of which an encircling collar made of a flexible, elastic plastics material is fitted. The collar has an elastic undulating outer contour, which runs in the manner of a rosette, with alternating elevations and depressions, along the circumferential direction. As a result, the filter insert is retained in an effective manner in the upper opening of the vessel and secured against tilting or falling out, even if the internal diameter of the upper opening of the vessel has considerable tolerances, as may be the case, in particular, with glass or ceramic vessels.

In other embodiments, even in the case of a plunger-type tea maker, the filter insert, rather than being inserted directly into the teapot, is inserted into a lower lid part, which is designed as a retaining ring and forms an introduction opening for the filter insert. This is the case, for example, in the case of the BISTRO NOUVEAU 1880 product (page 47 of the 2009 BODUM® catalog).

In the case of the abovementioned tea makers, the tea, when ready, is poured out via a lip-like pouring region of the teapot or through a tubular spout, which is formed integrally on the teapot itself. The pouring region or the nozzle are not usually closed. This has the disadvantage that the tea located in the teapot cools relatively quickly. Moreover, the tea located in the teapot, if handled incorrectly, can be spilled, or can splash out, through the open pouring region or the nozzle and give rise to scalding in the process.

So-called coffee plungers, which are frequently also referred to by the name of "French Press" or "coffee press" for short, are likewise known from the prior art. Such coffee makers usually comprise a cylindrical glass vessel, in which a filter plunger is arranged in a displaceable manner. The filter plunger comprises a plunger rod, at the lower end of which is fitted a filter with a fine wire or plastics-material mesh. The plunger rod is guided through a lid, which covers over the vessel in the upward direction.

The BODUM® Group have supplied, in particular, coffee makers under the product names BEAN 10945 or 10977 (pages 12-15 of the 2009 BODUM® catalog), the spouts of which are formed on a lid part, separately from the vessel, and are closed via a lever mechanism. This minimizes heat losses, and the risk of scalding as a result of incorrect handling is reduced. Such a coffee maker is described in PCT/CH 2009/000152 dated May 8, 2009, which is not a prior publication and the content of which is included herein by reference in its entirety. The corresponding lever mechanism, however, is not suitable for tea makers of the type mentioned above.

SUMMARY OF THE INVENTION

It is therefore an object of the present invention to specify a beverage maker with filter insert in the case of which heat losses are reduced and the risk of spillage or splashing of a beverage accommodated in it is reduced.

The invention provides a beverage maker having the following features:
  a vessel, which is open in the upward direction;
  a filter insert, which can be introduced into the vessel, is open in the upward direction and has a multiplicity of filter openings; and
  a lid, which at least partially covers over the vessel and comprises a lower lid part with a lower covering wall, which partially covers over the vessel, wherein the lower lid wall contains an introduction opening, into which the filter insert is inserted, and therefore the filter insert extends through the introduction opening into the vessel.

In order to achieve the aforementioned object, the lower lid part is retained with sealing action on the vessel. A pouring opening is formed in the lower covering wall, in order for liquid to be poured out of the vessel through the pouring opening. The lid comprises a closure for the pouring opening, wherein the closure has a lever which is fitted on the lid, above the lower covering wall, such that it can be pivoted about a horizontal axis and has an actuating region, in order for the lever to be pivoted from a first position, in which the closure closes the pouring opening, into a second position, in which the closure frees the pouring opening.

This means that a valve is formed in the lid, it being possible for this valve to be specifically opened and closed. The risk of a beverage being accidentally spilled or splashed from the beverage maker is thus reduced. In addition, it is ensured that heat does not get lost unnecessarily through the pouring opening.

The beverage maker is preferably a plunger-type tea maker ("tea press"). In this case, the beverage maker thus comprises, in particular, a plunger, which can be displaced along a displacement direction in the filter insert and is guided, preferably with sealing action, in a cylindrical side-wall region of the filter insert.

A plunger rod with a first and a second end is preferably connected to the plunger. The plunger is arranged at the first end of the plunger rod, while an actuating element for the plunger is fitted at the second end. The lid then preferably also comprises an upper lid part, which has the plunger rod passing through it and has an upper covering surface, which at least partially covers over the lower lid part, in particular in the region of the introduction opening for the filter insert.

The upper lid part can be placed in position preferably directly on the lower lid part, but can also rest on the filter insert. In a preferred configuration, the upper lid part can be connected, in particular latched, in a releasable manner to the lower lid part, in order to avoid unintentional slippage of the upper lid part and thus of the plunger rod.

In a preferred configuration, the upper lid part has a skirt, which extends downward into the filter insert from the upper covering surface. As a result, on the one hand, the upper lid part is centered and stabilized against tilting. On the other hand, the filter insert is thus also fixed in the insert opening, and the situation where liquid passes directly out of the filter insert, bypassing the closure, is prevented.

The sealing between the lower lid part and the vessel takes place preferably all the way around the periphery of the vessel. However, this is not imperative. The sealing is provided at least in such a region that, during normal use, essentially no liquid can escape between the lower lid part and the vessel.

The lower lid part is preferably inserted into an upper opening of the vessel and sealed on the inside of the vessel. In an advantageous configuration, for this purpose, the lower lid part comprises a vertically downwardly extending encircling skirt, which extends into the vessel and on the outside of which is arranged at least one encircling sealing element, which butts with sealing action against the inside of a side wall of the vessel.

The lower lid part may be fastened in a releasable manner on the vessel, e.g. via a bayonet connection or via a latching connection.

In order to make it possible for the beverage to be poured out in a specific manner, a spout is formed preferably either on the lower lid part or on the vessel, above the lower covering wall. Such a spout may be designed, for example, in a lip-like manner, or in the form of part of a tube or a tube, like a pouring nozzle. The pouring opening, which can be closed by the closure, is located here between the interior of the vessel and the spout.

The pouring opening is then preferably arranged between the introduction opening and the spout, in respect of the horizontal (lateral) plane, and therefore the pouring opening, when the beverage maker is tilted for pouring purposes, ends up located beneath the introduction opening. This prevents the situation where liquid escapes between the introduction opening and the filter insert, if there is insufficient sealing, or no sealing at all, at this location.

The actuating region of the lever is then preferably arranged on a side of the introduction opening which is directed away from the pouring opening and the spout, i.e. it is located in the rear region of the beverage maker, and therefore it can be actuated, for example, by a user's thumb. The lever then extends laterally, on at least one side, but preferably on both sides, around the introduction opening, so that the insertion of the filter insert is not obstructed.

In particular it is possible for the lever to have a ring-like region, which forms a through-passage opening, through which the filter insert extends, i.e. the lateral dimensions (in the case of a circular opening, the diameter) of the through-passage opening are at least exactly the same as the lateral dimensions of the insert opening, but preferably greater than these and in particular greater than the lateral dimensions of the filter insert.

Particularly straightforward and reliable mounting of the lever is achieved if bearing elements for mounting the lever in a pivotable manner on the lower lid part are present on two opposite sides of the ring-like region. Such bearing elements may be formed in one piece with the lever and, in the simplest case, by a respective bearing stub on each side. Accordingly, complementary bearing elements are then formed on the lower lid part, preferably in the region of the outer periphery thereof. These may be, in particular, two mutually opposite, mouth-like bearing elements for accommodating the bearing stubs, wherein the bearing stubs can be clicked into the bearing elements by overcoming an elastic spring force.

The vessel will often have a handle. In this case, it is preferred if the actuating region of the lever is adjacent to the handle and projects beyond the outer wall of the vessel in particular above the handle. This makes one-handed operation possible, in that the user actuates the lever with the thumb of the same hand in which he is also holding the vessel. In particular the lower lid part may have a side wall which extends upward from the lower covering wall and in which a through-passage opening is formed in a region which is directed away from the spout, and wherein the actuating region of the lever extends through the through-passage opening.

The lever is preferably spring-loaded in the direction of its first position, in order to ensure that the pouring opening is closed as long as the lever is not actuated deliberately. Instead, however, it is also possible for the lever to be designed such that the pouring opening is closed solely on account of the weight of the lever and of the closure body, as long as the actuating region is not subjected to any pressure.

A compression spring is preferably present in order to generate the spring force. This spring is arranged between the lever and the lower covering wall located therebeneath, preferably in a rear region of the lid, which is directed away from the spout, in order for the lever to be biased in the direction of its first position by a spring force. Such a spring, however, may also be arranged between the lever and a lid region arranged above the lever, in a region of the lever which is adjacent to the spout.

If the compression spring is arranged in the rear lid region, a cup-like depression (spring mount) extending in the direction of the vessel interior is formed preferably in the covering wall, and the compression spring extends into this depression. This means that the compression spring is secured against lateral displacement or even falling out, and a sufficient spring length for the required spring excursion is made possible.

The lever can itself close the pouring opening. For this purpose, a closure body is formed in one piece on the lever, or separately therefrom, in order for the pouring opening to be closed in the first position. The closure body may be formed, in particular, of a softer material than the rest of the lever, in order for improved sealing action to be achieved. However, it is also possible for the lever to act, for example, indirectly on a second lever, which is retained separately on the lid and has a closure body fitted thereon.

The filter insert is retained preferably elastically in the introduction opening. It is particularly preferably retained with sealing action in the introduction opening. In a preferred configuration, the filter insert is designed as in the aforementioned WO 2007/082391, i.e. it has a hollow filter body and an encircling collar, which is connected thereto and is made of a flexible, elastic material, wherein the collar has an elastic outer contour which runs in the manner of a rosette, with alternating crests and troughs, along the circumferential direction, in order for the filter insert to be retained in the introduction opening.

The vessel may be configured with one wall or, for example, also with a double wall.

BRIEF DESCRIPTION OF THE DRAWINGS

Preferred embodiments of the invention will be described hereinbelow with reference to the drawings, which serve merely for explanatory purposes and should not be interpreted as being limiting. In the drawings.

DESCRIPTION OF PREFERRED EMBODIMENTS

Figure 1:
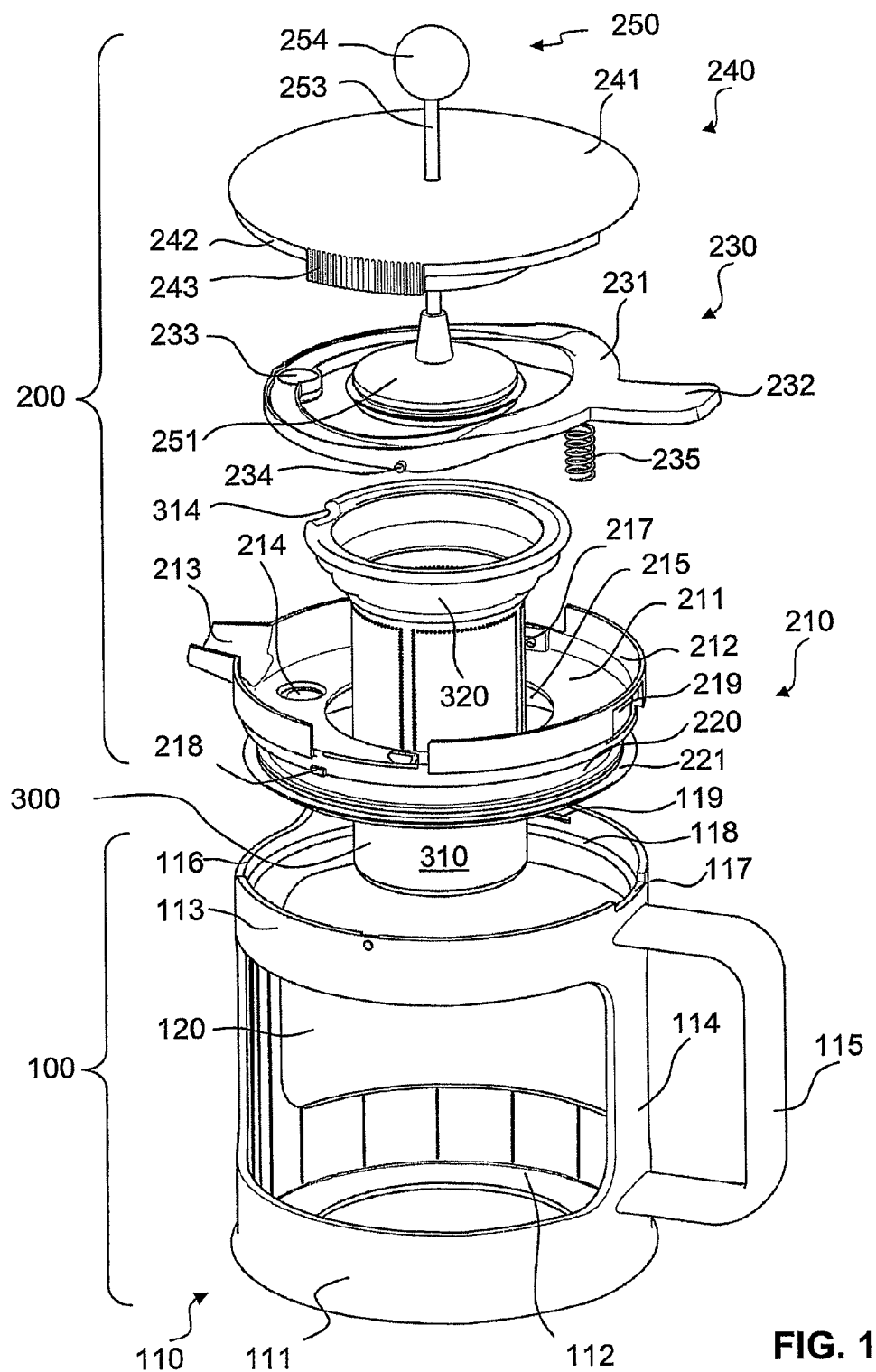
FIG. 1 shows an exploded illustration, in perspective, of a beverage maker according to the invention.
Figure 2:
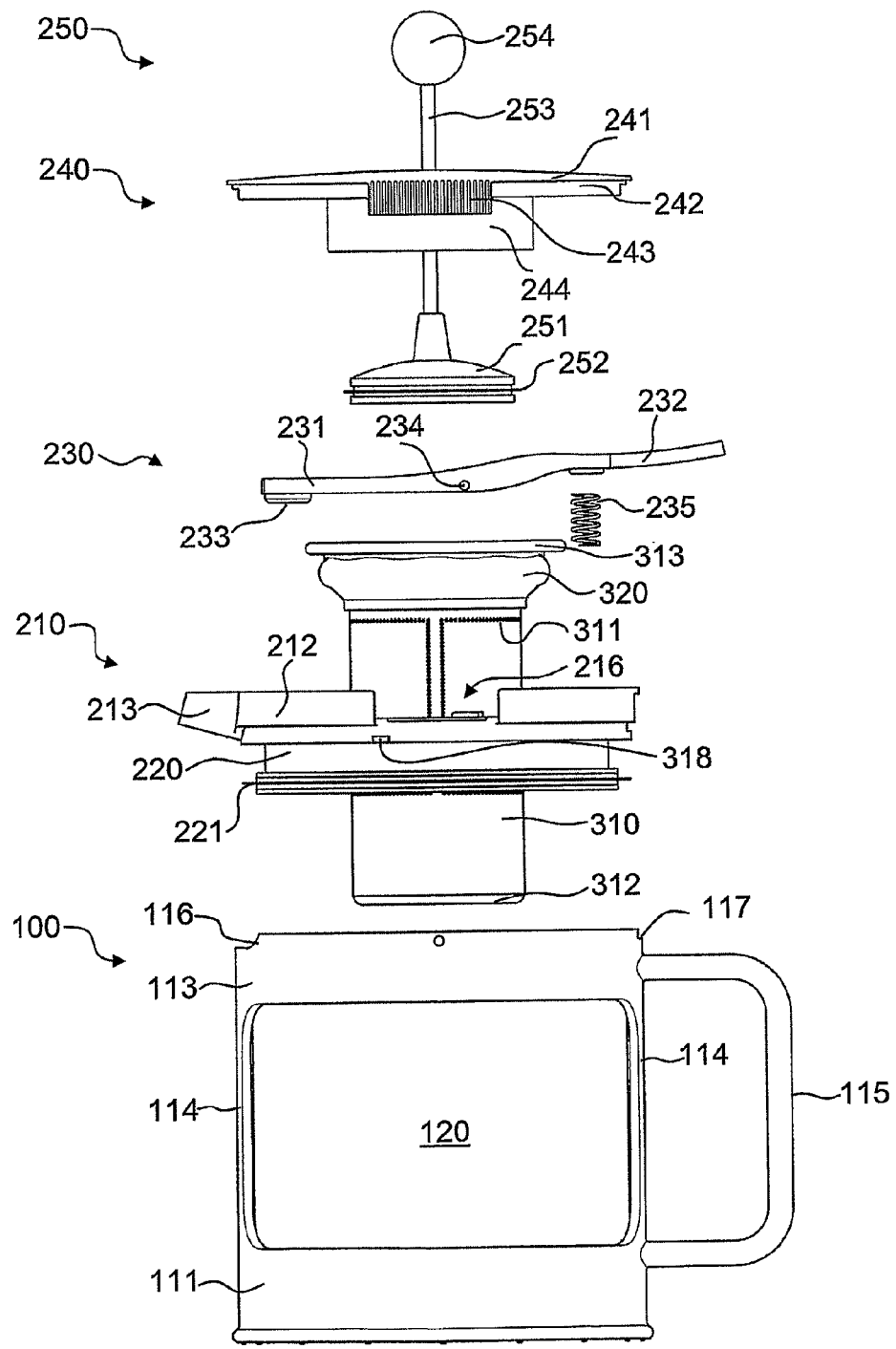
FIG. 2 shows an exploded illustration in side view.
Figure 3:
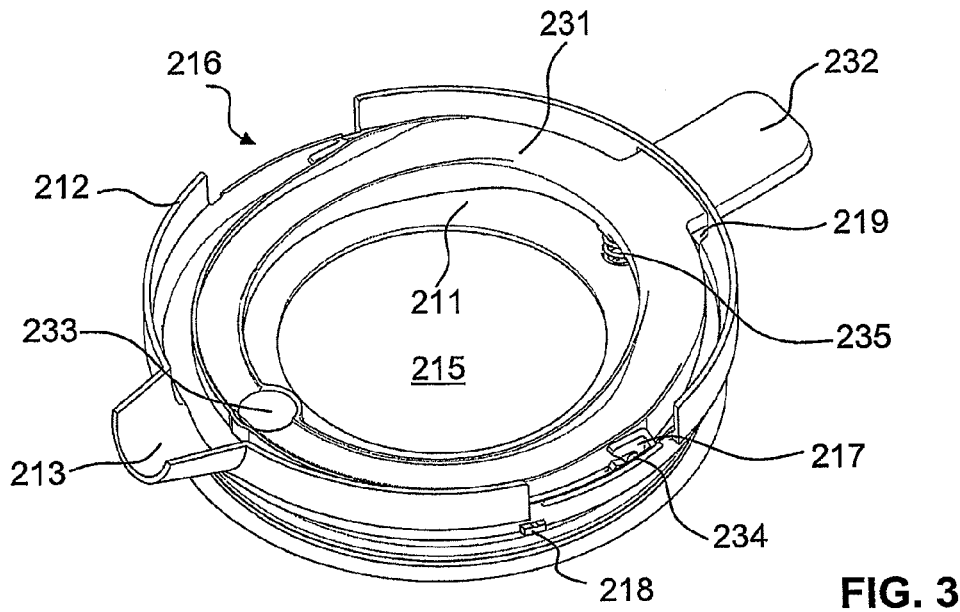
FIG. 3 shows a perspective view of a lower lid part with a closure mounted thereon.

FIGS. 1 to 5 illustrate various views of a preferred embodiment of a beverage maker according to the invention in the form of a plunger-type tea maker ("tea press"). The beverage maker comprises a vessel 100, a lid 200 and a filter insert 300.

The vessel 100 may also be referred to as a teapot. This vessel comprises a cylindrical glass container 120, which is open in the upward direction and is retained in a holder 110 made of plastics material. The holder 110 has a lower encircling ring 111, which encloses a lower side-wall region of the cylindrical glass container 120, and an upper encircling ring 113, which encloses an upper peripheral region of the glass container 120. These two rings are connected to one another by vertical crosspieces 114. The rear region of the holder 110 has a handle 115 formed in it, this handle likewise connecting the upper ring 113 to the lower ring 111. An encircling base flange 112 extends inward from the lower ring 111, and has the base of the glass container 120 resting on it. The upper ring 113 projects a certain distance beyond the upper periphery 118 of the glass container. In the upper peripheral region of the upper ring 113, a rear recess 117 is formed above the handle 115, and a front recess 116, which is deeper and wider than the rear recess 117, is formed diametrically opposite this rear recess 117. On the inside of the projecting region of the upper ring 113, two guide grooves 119 for a bayonet connection in relation to the lid 200, which will be described in more detail below, are formed laterally on two opposite sides.

The lid 200 comprises a lower lid part 210, a closure lever 230, an upper lid part 240 and a plunger 250.

The lower lid part 210 comprises an essentially planar lower covering wall 211, which partially covers over the vessel 100 in the upward direction. The lower covering wall 211 has two openings, that is to say a pouring opening 214 and an introduction opening 215 for the filter insert 300, this introduction opening being considerably larger than the pouring opening. Apart from these openings, the lower covering wall 211 covers over the upper opening of the vessel 100 in its entirety.

A cylindrical skirt 220 extends downward into the vessel from the lower covering wall 211. An encircling, flexible sealing lip 221 projects outward from the cylindrical skirt 220, and this sealing lip, together with the cylindrical side wall of the glass container 120, forms a seal between the vessel 100 and the lower lid part 210.

At a location further outward than the skirt 220, as seen laterally, a side wall 212 extends upward from the lower covering wall 211. The side wall widens somewhat in the upward direction via a step. It is interrupted laterally above the step by two opposite recesses 216, in order to accommodate grip regions 243 of the upper lid part 240. This will be described in more detail hereinbelow. Above the handle 115, a through-passage opening 219 is formed in the side wall 212, in order for an actuating region 232 of the closure lever 230 to pass outward. This will also be described in more detail hereinbelow. A spout 213 is formed on the side diametrically opposite this through-passage opening 219, the spout here being in the form of an approximately centrally cut-open tube. However, the precise form of the spout is immaterial, and it would also be possible for the spout to be designed, for example, in the form of a lip or to form a tubular nozzle.

Beneath the recesses 216, but above the covering wall 211 and adjacent to the side wall 212, and within the latter, two bearing elements 217 for the closure lever 230 are formed on two opposite sides of the lower lid part 210, these bearing elements being of mouth-like design, such that bearing stubs 234 of the closure lever 230 can be clicked into these bearing elements by overcoming an elastic spring force. Likewise beneath the recesses 216, two bayonet stubs 218 are formed on the outside of the side wall 212, it being possible for these bayonet stubs to be introduced into the guide grooves 119 on the upper ring 113 of the vessel holder 110, in order for the lower lid part 210 to be locked to the vessel 100 in a releasable manner via a bayonet connection. In this way, the lower lid part 210 is reliably safeguarded against falling out of the vessel 100.

The closure lever 230 has a ring-like region 231. The latter has a central opening, which has a larger diameter than the introduction opening 215 of the lower lid part. This means that the filter insert 300 can be pushed into the introduction opening through the opening. An actuating region 232 in the form of an elongate flange is formed at the rear end of this ring-like region 231. A closure body 233 is located at the opposite, front end of the ring-like region 231, and is formed from a softer material than the ring-like region 231. The already mentioned bearing stubs 234 are located on two opposite sides, about 90° away from the actuating region 232 and from the closure body 233 as seen in the circumferential direction, it being possible for these bearing stubs to be used to click the closure lever into the bearing elements 217, and therefore the closure lever can be pivoted about a horizontal axis connecting the bearing stubs.

A spring 235 can be inserted into a spring mount 222 (FIG. 4) and, in the assembled state of the tea maker, forces the closure lever 230 upward by way of its rear end, and therefore the closure body 233 is pressed onto the pouring opening 214 and closes the same. Applying pressure to the actuating region 232 allows the closure body 233 to be raised up from the pouring opening 214, in order to free the pouring opening 214. For this purpose, the actuating region 232 is guided through the already mentioned through-passage opening 219 in the side wall 212 of the lower lid part 210 and, in the assembled state of the tea maker, it ends up located above the handle 115 of the vessel, wherein the actuating region 232 projects beyond the side wall of the vessel 100 in the rearward direction. The interaction of the closure lever 230 with the lower lid part 210 is clearly evident, in particular, also from FIG. 3.

The filter insert 300 comprises an essentially hollow-cylindrical filter body 310 with a closed base 312 (FIG. 2) and an encircling, cylindrical side wall. A plurality of zones of filter openings 311 (FIG. 2) are formed in an upper side-wall region, these zones being indicated only highly schematically in the figures. In reality, such filter openings are located over all the rectangular surface-area regions, which are evident in FIGS. 1, 2 and 5. In a lower region of the side wall, the filter body 310, in contrast, is of liquid-impermeable design.

In the region of its upper end, the filter body 310 initially widens and has, at the upper periphery, a laterally outwardly extending, encircling bearing flange 313, by way of which the filter insert, in the assembled state of the tea maker, rests on that region of the lower covering wall 211 which encloses the insert opening 215. A recess 314 (FIG. 1) interrupts the flange 313 in the region of the pouring opening 214.

In the region of its upper end, the filter body 310, in addition, is encased by an elastic, encircling collar 320. The collar has an elastic, undulating outer contour which runs in the manner of a rosette, with alternating crests and troughs, along the circumferential direction. This means that the filter insert is retained in an effective manner in the insert opening 215 and, in addition, a certain sealing action is achieved between the lower lid part 210 and the filter insert 300. For a more detailed configuration of a filter insert with such a collar, reference is made to WO 2007/082391, which has already been mentioned.

Figure 4:
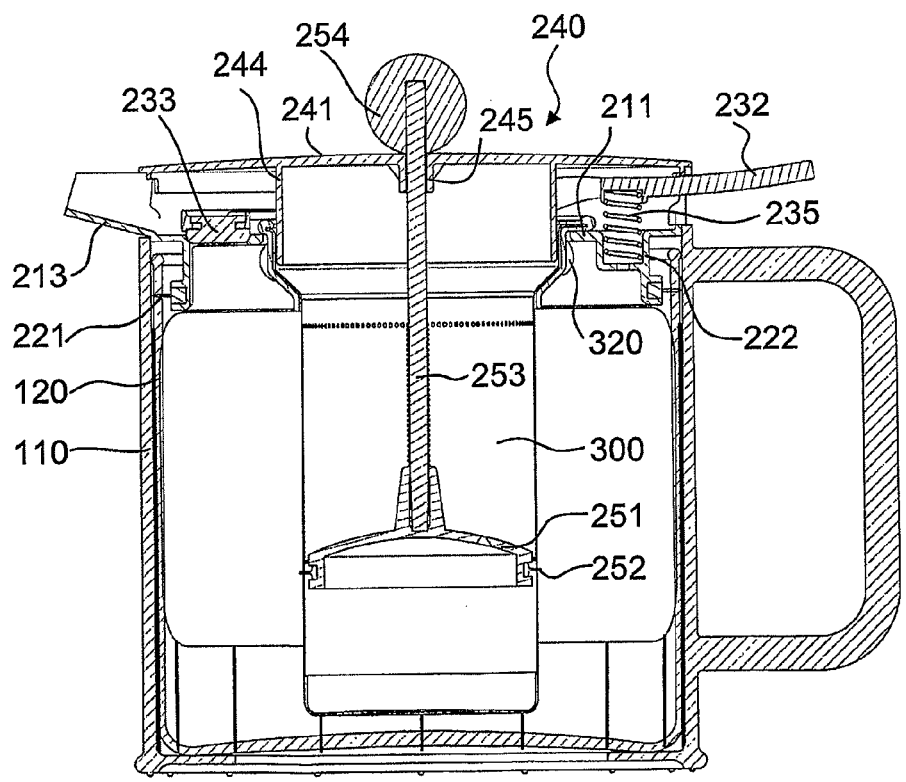
FIG. 4 shows a central longitudinal section through the beverage maker from FIG. 1.
Figure 5:
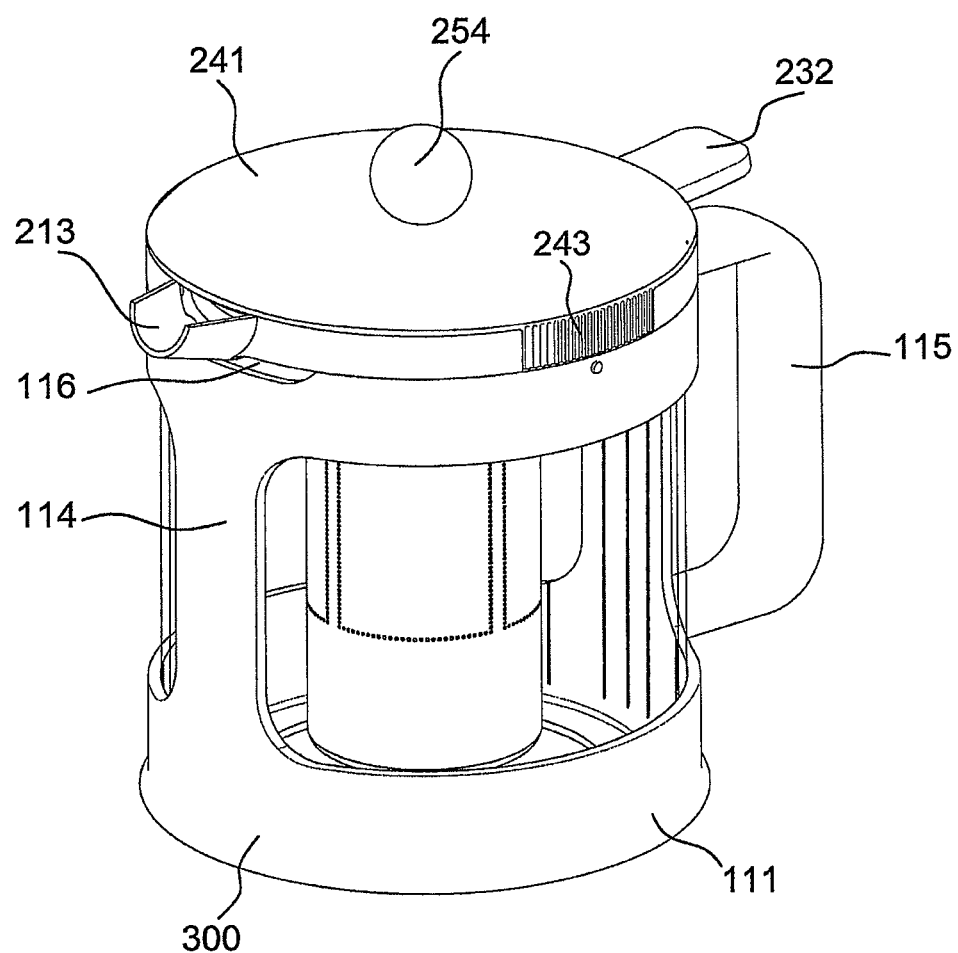
FIG. 5 shows a perspective view of the beverage maker from FIG. 1.

The upper lid part 240 has an upper covering wall 241, which, with the exception of the spout 213, covers over the lower lid part 210 in its entirety. A short encircling annular wall 242 extends downward from the covering wall 241 and, in the assembled state of the tea maker, ends up located within the side wall 212 of the lower lid part 210 (FIG. 4). On two laterally opposite regions, grip regions 243 extend downward from the covering wall 241 to a greater extent than the annular wall 242. These grip regions 243, in the assembled state of the tea maker, are accommodated in the recesses 216 of the side wall 212 of the lower lid part 210 and give rise there to a releasable latching connection between the lower lid part 210 and the upper lid part 240.

A comparatively small central through-passage opening for the plunger rod 253 of the plunger 250 is present in the upper covering wall 241. In the region of this through-passage opening, a guide bushing 245 extends downward, in order to guide the plunger rod 253. An encircling cylindrical skirt 244 extends downward from the upper covering wall 241 such that, in the assembled state of the tea maker, it projects into the upper peripheral region of the filter insert 300, in order to fix the latter, in addition, in the lower lid part 210 and to prevent liquid from passing from the filter insert 300 to the spout 213, bypassing the pouring opening 214 in the process (FIG. 4).

The plunger 250 comprises a plunger body 251, an encircling sealing lip 252 (FIG. 2) being formed on the laterally outer periphery thereof. The diameter of the plunger body 251 is selected such that the sealing lip can be displaced with sealing action in the cylindrical side-wall region of the filter body 310 (FIG. 4). The already mentioned plunger rod 253 passes through the corresponding opening in the upper lid part 240 and connects the plunger body 251 to an actuating knob 254. In this way, the plunger 250 can be actuated from the outside even when the upper lid part 240 rests on the lower lid part 210.

In order to prepare tea or other infusion beverages, the lower lid part 210 is connected to the vessel 100 via the bayonet connection, which has already been described above. The filter insert 300 is then introduced, through the ring-like region 231 of the closure lever 230, into the introduction opening 215 and thus into the vessel 100, and is fixed on the lower lid part 210 with the aid of the collar 320. Tealeaves or other material which can be subjected to extraction, e.g. pieces of dried fruit, etc., are then placed in the filter insert 300 and brewed using hot water. Thereafter, the upper lid part 240 is placed in position on the lower lid part 210 and fixed on the lower lid part 210 with the aid of the grip regions 243. The plunger 250 here is located in an upper position, and therefore a liquid exchange can take place, through the filter openings 311, between the interior and the exterior of the filter insert 300, whereas solids are held back in the filter insert 300. Once the beverage has been subjected to the extraction process for a sufficient length of time (that is to say it has "infused" sufficiently), the plunger 250 is pressed down with the aid of the actuating knob 254, and therefore the liquid-impermeable region of the filter insert 300, together with the plunger body 251, forms a closed-off chamber, in which the solids are essentially separated from the surrounding liquid. This largely stops any further extraction from taking place.

If the beverage is then to be poured out, the user grips the vessel 100 by the handle 115 and uses his thumb to press on the actuating region 232 of the closure lever 230. The closure body 233 is thus raised up from the pouring opening 214, and the user can then pour out the beverage, through the pouring opening 214, via the spout 213.

For cleaning purposes, the beverage maker can easily be dismantled, by the upper lid part 240 being separated from the lower lid part 210 and removed together with the plunger 250. The filter insert 300 can then be removed from the lower lid part 210. The collar 320 here safeguards the user against possible scalding, in case the filter body 310 should still be hot. Moreover, it is possible to release the bayonet connection between the vessel 100 and the lower lid part 210, and the lower lid part 210 can be removed from the vessel 100 together with the closure lever 230.

While the invention has been described above with reference to a preferred exemplary embodiment, the invention is in no way restricted to this exemplary embodiment, and a large number of modifications are possible without departing from the scope of the invention. In particular, the beverage maker need not necessarily be designed as a plunger-type tea maker; rather, it is also possible to dispense with a plunger. The closure lever may also be designed in some other way from that illustrated here and in particular need not extend in an annularly encircling manner, on both sides, around the introduction opening 215; rather, it may also be interrupted on one side. Moreover, it is not imperative for the lever 230 itself also to perform a closing function; rather, it is also conceivable to provide a separate, second lever, which carries the closure body 233 and can be pivoted, via the lever 230, between a closing position and a freeing position. The filter insert 300 may be configured in a wide variety of different ways, e.g. it may consist fully of plastics material, but it may also be produced, for example, at least partially from stainless steel. In certain embodiments, it is also conceivable for filter openings also to be provided in other regions of the filter insert and/or for, for example, a fine-mesh filter plunger, as is known from "French Press" coffee makers, to be provided instead of a closed plunger body, even if this means that further extraction of the beverage cannot be terminated, by pressing down the plunger, quite as effectively as in the case of the preferred embodiment illustrated above. It is also possible for the vessel holder to be designed differently from in the drawings or to be dispensed with altogether, e.g. if the vessel has a handle which is formed on it in one piece. The vessel may be produced completely from plastics material or from glass, but, for example, also wholly or partially from ceramic material. Correspondingly, it is also possible for the connection between the vessel and the lower lid part to be released in a manner other than that illustrated here. A large number of further modifications are, of course, possible.

The invention claimed is:

1. A beverage maker comprising:
   a vessel, which is open in an upward direction;
   a filter insert adapted to be introduced into the vessel, the filter insert being open in the upward direction; and
   a lid, which at least partially covers over the vessel and comprises a lower lid part with a lower covering wall, which partially covers over the vessel, the lower lid part being retained with sealing action on the vessel,
   an introduction opening being formed in the lower covering wall, the filter insert being inserted into the introduction opening, such that the filter insert extends through the introduction opening into the vessel,
   a pouring opening being formed in the lower covering wall, in order for liquid to be poured out of the vessel through the pouring opening,
   the lid comprising a closure for the pouring opening, the closure comprising a lever which is fitted on the lid, above the lower covering wall, the lever being pivotable about a horizontal axis and having an actuating region, in order for the lever to be pivoted from a first position, in which the closure closes the pouring opening, into a second position, in which the closure frees the pouring opening, and
   the lever extending laterally, on at least one side, around the introduction opening, so that insertion of the filter insert is not obstructed.

2. The beverage maker as claimed in claim 1, wherein the filter insert has a cylindrical side-wall region, and wherein the beverage maker comprises a plunger, which is displaceable along a displacement direction in the cylindrical side-wall region of the filter insert.

3. The beverage maker as claimed in claim 2, comprising:
   a plunger rod, which is connected to the plunger and has a first and a second end, wherein the plunger is arranged at the first end, and wherein an actuating element for the plunger is fitted at the second end; and
   an upper lid part, which has the plunger rod passing through it and has an upper covering surface, which at least partially covers over the lower lid part.

4. The beverage maker as claimed in claim 3, wherein the upper lid part rests on the lower lid part.

5. The beverage maker as claimed in claim 3, wherein the upper lid part is connectable in a releasable manner to the lower lid part.

6. The beverage maker as claimed in claim 3, wherein the upper lid part has a skirt, which extends downward into the filter insert from the upper covering surface.

7. The beverage maker as claimed in claim 1, wherein the lower lid part has a vertically downwardly extending encircling skirt, which extends into the vessel and on the outside of which is arranged at least one encircling sealing element, which butts with sealing action against the inside of a side wall of the vessel.

8. The beverage maker as claimed in claim 1, wherein a spout is formed on the lower lid part or on the vessel, above the covering wall, and wherein the pouring opening is arranged between the introduction opening and the spout, as seen in respect of a lateral plane.

9. The beverage maker as claimed in claim 8, wherein the actuating region of the lever is arranged on a side of the introduction opening which is directed away from the pouring opening.

10. The beverage maker as claimed in claim 1, wherein the vessel has a handle, and wherein the actuating region of the lever is adjacent to the handle.

11. The beverage maker as claimed in claim 1, wherein the lever is spring-loaded in the direction of its first position.

12. The beverage maker as claimed in claim 1, wherein a closure body is formed on the lever, in order for the pouring opening to be closed in the first position.

13. A beverage maker comprising:
    a vessel, which is open in an upward direction;
    a filter insert adapted to be introduced into the vessel, the filter insert being open in the upward direction; and
    a lid, which at least partially covers over the vessel and comprises a lower lid part with a lower covering wall, which partially covers over the vessel, the lower lid part being retained with sealing action on the vessel,
    an introduction opening being formed in the lower covering wall, the filter insert being inserted into the introduction opening, such that the filter insert extends through the introduction opening into the vessel,
    a pouring opening being formed in the lower covering wall, in order for liquid to be poured out of the vessel through the pouring opening, and
    the lid comprising a closure for the pouring opening, the closure comprising a lever which is fitted on the lid, above the lower covering wall, the lever being pivotable about a horizontal axis and having an actuating region, in order for the lever to be pivoted from a first position, in which the closure closes the pouring opening, into a second position, in which the closure frees the pouring opening,
    wherein the lever has a ring-like region, which forms a through-passage opening, through which the filter insert extends.

14. The beverage maker as claimed in claim 13, wherein bearing elements for mounting the lever in a pivotable manner on the lower lid part are present on two opposite sides of the ring-like region.

15. A beverage maker comprising:
    a vessel, which is open in an upward direction;
    a filter insert adapted to be introduced into the vessel, the filter insert being open in the upward direction; and
    a lid, which at least partially covers over the vessel and comprises a lower lid part with a lower covering wall, which partially covers over the vessel, the lower lid part being retained with sealing action on the vessel,
    an introduction opening being formed in the lower covering wall, the filter insert being inserted into the introduction opening, such that the filter insert extends through the introduction opening into the vessel, a pouring opening being formed in the lower covering wall, in order for liquid to be poured out of the vessel through the pouring opening, and the lid comprising a closure for the pouring opening, the closure comprising a lever which is fitted on the lid, above the lower covering wall, the lever being pivotable about a horizontal axis and having an actuating region, in order for the lever to be pivoted from a first position, in which the closure closes the pouring opening, into a second position, in which the closure frees the pouring opening, wherein the filter insert comprises a hollow filter body and an encircling collar, which is connected thereto and is made of a flexible, elastic material, and wherein the collar has an elastic outer contour which runs in the manner of a rosette, with alternating crests and troughs, along the circumferential direction, in order for the filter insert to be retained in the introduction opening.

16. A beverage maker comprising:

a vessel, which is open in an upward direction;

a filter insert adapted to be introduced into the vessel, the filter insert being open in the upward direction; and a lid, which at least partially covers over the vessel and comprises a lower lid part with a lower covering wall, which partially covers over the vessel, the lower lid part being retained with sealing action on the vessel, an introduction opening being formed in the lower covering wall, the filter insert being inserted into the introduction opening, such that the filter insert extends through the introduction opening into the vessel, a pouring opening being formed in the lower covering wall, in order for liquid to be poured out of the vessel through the pouring opening, the lid comprising a closure for the pouring opening, the closure comprising a lever which is fitted on the lid, above the lower covering wall, the lever being pivotable about a horizontal axis and having an actuating region, in order for the lever to be pivoted from a first position, in which the closure closes the pouring opening, into a second position, in which the closure frees the pouring opening, and the lower lid part having a vertically downwardly extending encircling skirt, which extends into the vessel and on the outside of which is arranged at least one encircling sealing element, which butts with sealing action against the inside of a side wall of the vessel.

17. The beverage maker as claimed in claim 16, wherein a spout is formed on the lower lid part or on the vessel, above the covering wall, and wherein the pouring opening is arranged between the introduction opening and the spout, as seen in respect of a lateral plane.

18. The beverage maker as claimed in claim 17, wherein the actuating region of the lever is arranged on a side of the introduction opening which is directed away from the pouring opening, and the lever extends laterally, on at least one side, around the introduction opening.

19. The beverage maker as claimed in claim 16, wherein the lever has a ring-like region, which forms a through-passage opening, through which the filter insert extends.

20. The beverage maker as claimed in claim 19, wherein bearing elements for mounting the lever in a pivotable manner on the lower lid part are present on two opposite sides of the ring-like region.

* * * * *